United States Patent
Hartmann (10) Patent No.: US 12,516,402 B2
(45) Date of Patent: Jan. 6, 2026

(54) BRAZING FOIL, OBJECT AND METHOD FOR BRAZING

(71) Applicant: Vacuumschmelze GmbH & Co. KG, Hanau (DE)

(72) Inventor: Thomas Hartmann, Hanau (DE)

(73) Assignee: Vacuumschmelze GmbH & Co. KG, Hanau (DE)

( * ) Notice: Subject to any disclaimer, the term of this patent is extended or adjusted under 35 U.S.C. 154(b) by 328 days.

(21) Appl. No.: 17/868,866

(22) Filed: Jul. 20, 2022

(65) Prior Publication Data
US 2023/0038008 A1 Feb. 9, 2023

(30) Foreign Application Priority Data
Jul. 26, 2021 (DE) .......................... 102021119252.8

(51) Int. Cl.
| | |
|---|---|
| *C22C 19/05* | (2006.01) |
| *B23K 1/00* | (2006.01) |
| *B23K 35/02* | (2006.01) |
| *B23K 35/30* | (2006.01) |
| *F28D 9/00* | (2006.01) |

(52) U.S. Cl.
CPC .......... *C22C 19/056* (2013.01); *B23K 1/0012* (2013.01); *B23K 35/0233* (2013.01); *B23K 35/304* (2013.01); *F28D 9/005* (2013.01); *C22C 2200/02* (2013.01)

(58) Field of Classification Search
CPC .. F28F 21/087; F28F 2275/04; B23K 35/304; B23K 35/0233; B23K 1/0012; B23K 35/3033; B23K 2103/05; C22C 19/056; F28D 2021/0042
See application file for complete search history.

(56) References Cited

U.S. PATENT DOCUMENTS 2,936,229 A * 5/1960 Shepard .................... C23C 4/06
420/583
3,493,366 A * 2/1970 White ................... C22C 19/053
420/586
(Continued)

FOREIGN PATENT DOCUMENTS

DE 3929222 A1 3/1991
EP 0016916 A1 10/1980
(Continued)

OTHER PUBLICATIONS

I. Hoyer 2013, Nickel ions in potable water and their migration out of brazing fillers and brazed joints, DVS Berichte 293, pp. 176-181.
(Continued)

*Primary Examiner* — Joel M Attey
*Assistant Examiner* — For K Ling
(74) *Attorney, Agent, or Firm* — Dickinson Wright PLLC (57) ABSTRACT

A nickel-based brazing foil with a composition consisting essentially of 11 atom %<Cr≤16 atom %, 0 atom %≤Mo≤3.5 atom %, 4 atom %≤B≤5.5 atom %, 11 atom %≤Si≤16 atom %, 0 atom %≤P≤0.5 atom %, 0 atom %≤C≤0.85 atom %, 0 atom %≤Fe≤5 atom %, 0 atom %≤Co≤5 atom %, 0 atom %≤Cu≤2 atom %, 0 atom %≤V≤2 atom %, 0 atom %≤Nb≤2 atom %, incidental impurities of ≤1.0 wt. % and the rest Ni, is provided.

7 Claims, 3 Drawing Sheets

(56) References Cited

U.S. PATENT DOCUMENTS

| | | | | |
|---|---|---|---|---|
| 3,516,826 | A | * | 6/1970 | Fontaine ............... F28F 21/087 |
| | | | | 420/47 |
| 4,314,661 | A | * | 2/1982 | DeCristofaro ..... B23K 35/3033 |
| | | | | 228/262.42 |
| 4,543,135 | A | * | 9/1985 | Bose ................... B23K 35/304 |
| | | | | 428/606 |
| 4,712,603 | A | * | 12/1987 | Bose ................... B23K 35/304 |
| | | | | 164/463 |
| 4,745,037 | A | | 5/1988 | DeCristofaro |
| 5,158,229 | A | * | 10/1992 | Bose ................... B23K 35/304 |
| | | | | 228/262.1 |
| 6,200,690 | B1 | | 3/2001 | Rabinkin |
| 6,656,292 | B1 | | 12/2003 | Rabinkin et al. |
| 6,749,104 | B2 | * | 6/2004 | Rabinkin ............. B23K 1/0012 |
| | | | | 228/183 |
| 8,052,809 | B2 | | 11/2011 | Hartmann et al. |
| 8,287,805 | B2 | | 10/2012 | Sjodin |
| 10,046,420 | B2 | | 8/2018 | Coughlan et al. |

FOREIGN PATENT DOCUMENTS

| | | | |
|---|---|---|---|
| EP | 0051461 | A1 | 5/1982 |
| EP | 0070383 | A1 | 1/1983 |
| EP | 0108959 | A1 | 5/1984 |
| EP | 0832409 | B1 | 2/2001 |
| EP | 0827438 | B1 | 11/2002 |
| EP | 1347869 | B1 | 10/2003 |
| EP | 1347858 | B1 | 4/2005 |
| EP | 1224050 | B1 | 5/2005 |
| EP | 0827437 | B2 | 9/2005 |
| EP | 1630510 | A1 | 3/2006 |
| EP | 1317330 | B1 | 10/2008 |
| EP | 2203574 | A1 | 7/2010 |
| EP | 2570227 | A1 | 3/2013 |
| EP | 2446996 | B1 | 4/2017 |
| WO | 9637355 | A1 | 11/1996 |
| WO | WO-9637335 | A1 * | 11/1996 ......... B23K 35/0233 |
| WO | 9641995 | A1 | 12/1996 |
| WO | 9734732 | A1 | 9/1997 |
| WO | 0130528 | A1 | 5/2001 |
| WO | 0222299 | A1 | 3/2002 |
| WO | 0240212 | A2 | 5/2002 |

OTHER PUBLICATIONS

G. Pajonk., Korrosionsschäden an gelöteten Plattenwärmetauschern. Sonderbände der praktischen Metallographie, vol. 36 (2004) pp. 371-378.

Hoyer 2010 Corrosion test of nickel filler metals in drinking water according to DIN EN 15664-1, DVS 263 pp. 400-404.

T. Hartman, Metal Leaching of Brazed Stainless Steel Joints Into Drinking Water, Proceedings from the 6th International Brazing and Soldering Conference IBSC 2015, Apr. 19-22, 2015, Long Beach, California, USA, pp. 1-6.

T. Hartman, Chromium Containing Amorphous Brazing Foils and Their Resistance to Automotive Exhaust Gas Condensate, Proceedings of the 5th International Brazing and Soldering Conference Apr. 22-25, 2012, Las Vegas, Nevada, USA, ASM International pp. 394-401.

B. Wielage, Comparative corrosion studies of conventional nickel-based brazing alloys and newly developed iron-based brazing alloys, Mat.-scientific and Materials technology 2010, 41, No. 6, 2010 Wiley-VCH Publisher GmbH &Co. KGaA, Weinheim pp. 413-421.

* cited by examiner

BRAZING FOIL, OBJECT AND METHOD FOR BRAZING

This U.S. patent application claims priority to DE Patent Application No. 10 2021 119 252.8, filed Jul. 26, 2021, the entire contents of which is incorporated herein by reference in its entirety.

TECHNICAL AREA

The invention relates to a brazing foil, an object and a method for brazing, in particular for brazing at least two parts of a heat exchanger that comes into contact with drinking water during operation. The object may be a heat exchanger such as a plate heat exchanger that comes into contact with drinking water during operation and has at least two parts that are brazed together.

RELATED ART

Stainless-steel plate heat exchangers can be joined cohesively in a high-temperature brazing process using an amorphous brazing foil. These heat exchangers come into contact with drinking water as it is heated and should therefore provide the best possible hygiene conditions. High-temperature-brazed plate heat exchangers are used to heat drinking water in many drinking water systems. Structurally, as described in EP0832409B1 or EP1630510B2, for example, these plate heat exchangers consist of a plurality of stamped metal plates made of stainless-steel, in particular of DIN 1.4404, that are largely brazed using copper-, nickel- or iron-based brazes in a high-temperature vacuum furnace to form compact, leakage-free and pressure-resistant components.

Soldering is a process for joining metal or ceramic parts using a molten filler referred to as a solder. A difference is made between soft soldering and hard soldering or brazing depending on the temperature at which the braze is processed, the processing temperature typically being between 10° C. and 50° C. above the liquidus temperature of the braze. Soft solders are processed at temperatures of below 450° C.; brazes, on the other hand, are processed at temperatures above 450° C. Brazes are typically used in applications in which a high mechanical strength of the brazed connection and/or a high mechanical strength at elevated operating temperatures is desired.

Plate heat exchangers transfer heat indirectly between two media such as fluids, for example. The fluids are separated from one another by stamped stainless-steel plates. The individual plates of the heat exchanger are arranged so as to form flow gaps through which hot and cold media flow in alternate layers, thereby transferring thermal energy from one medium to the other. Since the individual media are not in direct contact with one another and do not mix, it is important that the channels are effectively sealed off from one another. The specific manner in which the plates are stamped creates a turbulent flow that is helpful for good heat transfer.

The reduction of drinking water contamination by heavy metal ions in order to maintain good health is becoming increasingly important and is now required in many countries of the world under an increasing number of statutes. WO 96/37335 A discloses a method for the production of a heat exchanger in which the components of the heat exchanger are joined using an amorphous Ni—Cr—Mo—based brazing foil. The use of a subsequent additional heat treatment process reduces the contamination of the drinking water by heavy metal ions such as nickel.

Further improvements are, however, desirable in order to provide heat exchangers for drinking water applications that ensure a further reduction in contamination by heavy metal ions and that can be produced more easily.

SUMMARY

According to the invention there is provided a nickel-based brazing foil with a composition consisting essentially of 11 atom %<Cr≤16 atom %, 0 atom %≤Mo≤3.5 atom %, 4 atom %≤B≤7 atom %, 11 atom %≤Si≤16 atom %, 0 atom %≤P≤0.5 atom %, 0 atom %≤C≤0.85 atom %, 0 atom %≤Fe≤5 atom %, 0 atom %≤Co≤5 atom %, 0 atom %≤Cu≤2 atom %, 0 atom %≤V≤2 atom %, 0 atom %≤Nb≤2 atom %, incidental impurities of ≤1.0 wt. % and the rest Ni.

According to the invention there is provided a brazing foil having a chemical composition that is matched to the base material used such that phases or regions of the joint produced by metallurgical processes during brazing are able to withstand the attack of drinking water so that heavy metal ions in high concentrations are not released into the drinking water that flows over these phases or regions.

The foil according to the invention can be produced directly from the molten mass by means of rapid solidification to form an even amorphous foil of uniform thickness. The foil according to the invention should be produced in the desired geometric dimensions such as foil widths of 80 to 250 mm and foil thicknesses of over 30 μm up to approx. 60 μm and, when produced at a mean strip thickness of approx. 45 μm, has no brittle regions that cover more than 5% of the foil surface. Due to this low tendency towards brittleness, the foil can be shaped into preforms by punching and bending without significant levels of rejects due to foil brittleness.

It has, however, very surprisingly proved possible to drastically reduce metal ion precipitation from the brazed joints described into the drinking water, in particular with nickel-based brazing alloys that have a relatively low chromium content of 11 to 16 atom %, as long as the brazing alloy has a boron content of no more than approx. 7 atom %, preferably no more than 6 atom % or preferably no more than 5.5 atom %. It has been established that the quantity of heavy metal ions released into the drinking water increases with the quantity of boron present in the brazing material. As a result, the boron content of the brazing alloys according to the invention has been reduced in comparison to the known brazing alloys available on the market.

In further embodiments the alloy has at least 0.5 atom % of one or more of the elements Mo, Nb and V. In one embodiment 0.5 atom %≤Mo≤3.5 atom % Mo and no Nb or V are added to the alloy. In one embodiment the alloy contains Mo, no Nb, no V and 0.5 atom %≤Mo≤3.5 atom %.

It has been found that heat exchangers brazed using these brazing materials according to the invention release more than 50% less nickel into the drinking water they contain than comparable brazing materials with higher chromium contents but no molybdenum. In addition, it has come as a complete surprise that in the presence of 0.5 to 3.5 atom % molybdenum in the Ni/Cr brazing alloy the minimum possible boron content of the brazing alloy can be decreased by up to 4.5 atom % without impairing the producibility of the foil. Surprisingly, it has also been shown that in the presence of up to 3.5 atom % molybdenum the minimum boron content of the composition required for glass formation can be reduced substantially further than in alloys that contain no molybdenum. Good castability was also found at Boron contents below 6 atom %. It was even possible to produce alloys with good strip quality at boron contents of 4.5 atom %. In addition, it proved possible to increase the most ductiley producible strip thickness by reducing the boron content, which is advantageous for the cost-efficient further processing of the foil.

The effect of molybdenum on the reduction of nickel ion release by the brazed joints was surprising. Molybdenum is intrinsically known only for its ability to counter selective corrosion such as pitting and crevice corrosion in chromic steels and to effectively suppress these forms of corrosion in the presence of high chloride contents such as in sea water. There was, therefore, no expectation that it would result in a drastic reduction in heavy metal ion release and even the complete avoidance of nickel ion release into drinking water in relatively low-chloride drinking waters with brazing material with a relatively low chromium content.

Moreover, the low boron content is also able to reduce the diffusion time of the brazed joints. This means that with the brazing foil according to the invention, for example, the dwell time at brazing temperature can also be reduced by approx. 50% with no negative effect on either the tensile strengths of the joints or the release of heavy metals into the drinking water. This represents an economic advantage due to the reduced brazing time.

The elements Nb and V have similar effects to Mo.

In some embodiments the chromium content is defined further, with 11 atom %≤Cr≤14 atom %.

In some embodiments the sum of O and N in the form of incidental impurities is less than 0.035 atom %.

In some embodiments the sum of metalloid elements Si, B, P and C is defined, with 14 atom %≤(Si+B+P+C)≤20 atom %.

In some embodiments the brazing foil is at least 80%, preferably at least 90%, amorphous.

In some embodiments, after a bending test, the brazing foil has brittle factures of no more than 10%, preferably no more than 5%, of the sum of the lengths of the bend folds.

In some embodiments the brazing foil has a mean thickness d, with 20 µm≤d≤80 µm, preferably 30 µm to 70 µm, preferably 40 µm to 60 µm. At this thickness the brazing foil provides a suitable quantity of braze for the brazing of plate heat exchangers.

In some embodiments the brazing foil has a width of 1 mm to 300 mm, preferably 50 mm to 250 mm, preferably 80 mm to 250 mm. The brazing foil can thus be provided with a surface that is suitable for covering and brazing a layer of a plate heat exchanger for drinking water applications.

A brazing foil according to any one of the preceding embodiments can be used to produce a heat exchanger that comes into contact with drinking water during operation.

The invention also provides for the production of an object having a first part and a second part, the first part being permanently joined to the second part by a braze seam produced with a brazing foil according to any one of the preceding embodiments.

The braze seam is produced at a brazing temperature of between 1050° C. and 1250° C., preferably between 1080° C. and 1190° C., for more than 0.5 h, preferably for 0.5 h to 10 h, particularly preferably for 0.5 h to 3 h, followed by cooling.

The first part and the second part of the object may be made of a stainless steel that contains at least 12 wt. % chromium and at least 0.5 wt. % molybdenum.

In a further embodiment the composition of the stainless steels is further defined such that the first part and the second part are each made of a stainless steel that contains at least 15 wt. % chromium and/or 1.3 wt. % to 3 wt. % molybdenum.

In a further embodiment the first part and/or the second part is made of a DIN 1.4404 or DIN 1.4401 stainless steel.

The object may be a heat exchanger, in particular a plate heat exchanger or a part of a plate heat exchanger that comes into contact with drinking water during operation.

In some embodiments the object is a heat exchanger with a media-contacting surface area ratio of greater than 0.5 $m^2/l$, preferably 0.5 $m^2/l$ to 2.5 $m^2/l$, preferably 1 $m^2/l$ to 2 $m^2/l$. Throughout this document, the $m^2/l$ ratio refers to square metre of inner surface of the heat exchanger per litre of holding capacity.

In some embodiments the braze seam and/or the object have a burst pressure of over 80 bar. This makes it possible to guarantee reliable operation of an object in the form of a plate heat exchanger.

In some embodiments a Ni concentration of less than 20 µg/l, preferably less than 10 µg/l, preferably less than 5 µg/l, is released from a brazed object after an exposure time of 360 hours at 25° C. into a volume of drinking water, resulting in a water-contacting area of 0.23 $m^2/l$. This significantly reduces the contamination of the drinking water by nickel originating in the brazing foil and/or the material of the object in comparison to the prior art.

In some embodiments, after an exposure time of 360 hours at 25° C. in a volume of drinking water, a water-contacting area of 0.23 $m^2/l$ being provided, a total concentration of Ni plus Cu plus Fe of less than 40 µg/l, preferably less than 20 µg/l, is released. This better avoids the contamination of the drinking water by Ni as well as by Cu and Fe from the brazing foil and/or the material of the object.

The parts may take the form of a plate, a pipe or a corrugated sheet.

The plate heat exchangers made of stainless steel 1.4404 and brazed according to the invention ensure that the nickel limit values required under the German Drinking Water Regulations (Trinkwasserverordnung) are met reliably. A further advantage is that a heat exchanger produced according to the invention also emits significantly fewer heavy metal ions of other elements and is therefore substantially more hygienic.

The brazing foil preferably has the following properties:
  The brazing alloy can be produced as a foil with a thickness of up to 60 µm and a width of up to 250 mm by means of rapid solidification technology.
  It also remains ductile at high foil thicknesses and can thus be matched to the form of the parts to be brazed without cracking due to brittleness.
  The foil produced may have a percentage of brittle fractures of no more than 5% at a mean foil thickness of 45 µm. Conversely, the foil may be fully ductile over at least 95% of the foil surface.
  It is possible to process the foils at a mean thickness of at least 45 µm by means of cutting, punching and bending and to bend them through at least 180° without more than 5% of the entire processed length cracking due to brittleness.
  The liquidus temperature of the braze is below 1150° C. such that the plate heat exchanger brazing process takes place at maximum temperatures of below 1200° C.
  The composition of the braze can be selected such that the brazed joints with the stainless steel 1.4404 lead to chemical compositions which, even after metallurgical modification of the starting materials as a result of the heat-treatment element of the high-temperature brazing process, retain a structure that is characterised by sufficiently high corrosion resistance and leads to low heavy metal, in particular nickel, precipitation, and maintain this desired hygienic condition over a long contact period with drinking water without any measurable signs of corrosive degradation of the heat exchanger.

Also provided is a method for brazing two or more parts. A brazing foil according to any one of the preceding embodiments is inserted between two or more parts to be joined, the parts to be joined having a higher melting temperature than the brazing foil in order to provide a brazing arrangement. The brazing arrangement is heated to a brazing temperature that is above the liquidus temperature of the brazing foil and below the melting temperature of the parts. The brazing arrangement is then cooled between the parts to form a brazed connection, thereby producing a brazed joint between the parts.

In some embodiments the brazing arrangement is heated to a brazing temperature of between 1050° C. and 1250° C., preferably between 1080° C. and 1190° C., the brazed joint being held above the liquidus temperature of the brazing foil for more than 0.5 hours, preferably for 0.5 to 10 hours, particularly preferably for 0.5 to 3 hours.

In some embodiments the heating of the brazing arrangement is carried out at a brazing temperature above the liquidus temperature of the brazing foil in a vacuum furnace. The liquidus temperature of the brazing foil depends on the exact composition of the brazing foil.

In one embodiment the brazed joint is heated to a brazing temperature above the liquidus temperature of the brazing foil in a vacuum furnace and cooled to a temperature of 200° C. or lower, for example, to room temperature, for example.

In some embodiments the brazing arrangement constitutes a plate stack that is compressed by a load during the brazing process. The weight of this load is at least 20%, preferably at least 50%, of the weight of the brazed joint.

In some embodiments a braze preform made of the amorphous brazing foil is shaped by means of cutting and/or punching and/or bending into a form that matches the parts to be joined and then inserted between two or more parts to be joined. For example, a piece of the brazing foil may be cut or punched out and then bent to form a cylinder, which is then inserted between two pipes to be connected.

In a further embodiment, the brazing foil has a composition consisting essentially of 11 atom %<Cr≤16 atom %, 0 atom %≤Mo≤3.5 atom %, 4 atom %≤B≤5.5 atom %, 11 atom %≤Si≤16 atom %, 0 atom %≤P≤0.5 atom %, 0 atom %≤C≤0.85 atom %, 0 atom %≤Fe≤5 atom %, 0 atom %≤Co≤5 atom %, 0 atom %≤Cu≤2 atom %, 0 atom %≤V≤2 atom %, 0 atom %≤Nb≤2 atom %, incidental impurities of ≤1.0 wt. %, at least 0.5 atom % of one or more of the elements Mo, Nb and V being present, and the rest Ni.

This brazing foil may have a chromium content of 11 atom %≤Cr≤14 atom %. The upper limit of the boron content may also be reduced such that 4 atom %≤B≤6 atom %, preferably 4 atom %≤B≤5.5 atom %.

In a method for producing a heat exchanger that comes into contact with drinking water during operation the brazing foil used has a composition consisting essentially of 11 atom %<Cr≤16 atom %, 0 atom %≤Mo≤3.5 atom %, 4 atom %≤B≤7 atom %, 11 atom %≤Si≤16 atom %, 0 atom %≤P≤0.5 atom %, 0 atom %≤C≤0.85 atom %, 0 atom %≤Fe≤5 atom %, 0 atom %≤Co≤5 atom %, 0 atom %≤Cu≤2 atom %, 0 atom %≤V≤2 atom %, 0 atom %≤Nb≤2 atom %, incidental impurities of ≤1.0 wt. %, at least 0.5 atom % of one or more of the elements Mo, Nb and V being present, and the rest Ni. This brazing foil is inserted between two or more parts of a heat exchanger to be joined, the heat exchanger or portions thereof coming into contact with drinking water during operation and the parts to be joined having a higher melting temperature than the brazing foil. To provide a brazed joint, the stack of plates/brazing foils is heated to a brazing temperature that is above the liquidus temperature of the braze and below the melting temperature of the parts, and then cooled between the plates to form solidified brazed connections in order to provide a permanent brazed joint.

In some embodiments the stack or at least the brazing foil of the brazing arrangement is heated to a brazing temperature of between 1050° C. and 1250° C., preferably between 1080° C. and 1190° C., the stack being held above the liquidus temperature of the brazing foil for more than 0.5 hour, preferably for 0.5 to 10 hours, particularly preferably for 0.5 to 3 hours.

In some embodiments the heating of the brazing arrangement takes place at a brazing temperature above the liquidus temperature of the brazing foil in a vacuum furnace.

In an embodiment the brazing arrangement is heated to a brazing temperature above the liquidus temperature of the brazing foil in a vacuum furnace and then cooled to a temperature of 200° C. or less, for example to room temperature.

In some embodiments the brazing arrangement is also weighted down with an additional load and heated with the load. The weight of the load may be at least 20%, preferably at least 50%, of the weight of the brazed joint.

In some embodiments a braze preform made of the amorphous brazing foil is shaped by means of cutting and/or punching and/or bending into a form that matches the parts to be joined, and then inserted between two or more parts to be joined.

In an embodiment the brazing foil contains Mo but no Nb or V and 0 atom %≤Mo≤3.5 atom %.

In some embodiments the chromium content is further defined such that 11 atom %≤Cr≤14 atom %.

In some embodiments the boron content is further defined such that 4 atom %≤B≤6 atom %, preferably 4 atom % s B s 5.5 atom %.

In some embodiments the sum of O and N in the form of incidental impurities is defined as less than 0.035 atom %.

In some embodiments the total sum of metalloid elements is 14 atom %≤(Si+B+P+C)≤20 atom %.

In some embodiments the brazing foil is at least 80%, preferably at least 90%, amorphous.

In some embodiments the brazing foil has a mean thickness d, where 20 μm s d s 80 μm, preferably 30 μm to 70 μm, preferably 40 μm to 60 μm.

In some embodiments the brazing foil has a width of 1 mm to 300 mm, preferably 50 mm to 250 mm, preferably 80 mm to 250 mm.

In some embodiments the parts to be brazed are made of a stainless steel, preferably a DIN 1.4404 or 1.4401 stainless steel.

In some embodiments the parts to be brazed take the form of a plate, a circuit board sheet metal profile, a pipe or a corrugated sheet.

In some embodiments the brazing foil has an area that is greater than the brazed connection, it being possible after production of the brazed connection for regions of the parts that are outside the brazed connection and come into contact with drinking water during heat exchanger operation to be coated with the braze.

The brazing foil according to any one of the embodiments according to the invention can be produced by means of rapid solidification technology. In one embodiment, a method for producing a brazing foil comprises the provision of a molten mass consisting essentially of 11 atom %<Cr≤16 atom %, 0 atom %≤Mo≤3.5 atom %, 4 atom %≤B≤7 atom %, preferably 4 atom %≤B≤5.5 atom %, 11 atom %≤Si≤16 atom %, 0 atom %≤P≤0.5 atom %, 0 atom %≤C≤0.85 atom %, 0 atom %≤Fe≤≤atom %, 0 atom %≤Co≤5 atom %, 0 atom %≤Cu≤2 atom %, 0 atom %≤V≤2 atom %, 0 atom %≤Nb≤2 atom %, incidental impurities of ≤1.0 wt. % and the rest Ni, and an amorphous, ductile brazing foil is produced by rapidly solidifying the molten mass on a moving cooling surface at a cooling speed of more than approx. 104 K/s, or more than 105 K/s.

The molten mass may have a chromium content of 11 atom %≤Cr≤14 atom % and/or at least 0.5 atom % of one or more of the elements Mo, Nb and V.

In a further embodiment the molten mass consists substantially of 11 atom %<Cr≤16 atom %, 0 atom %≤Mo≤3.5 atom %, 4 atom %≤B≤7 atom %, 11 atom %≤Si≤16 atom %, 0 atom %≤P≤0.5 atom %, 0 atom %≤C≤0.85 atom %, 0 atom %≤Fe≤5 atom %, 0 atom %≤Co≤5 atom %, 0 atom %≤Cu≤2 atom %, 0 atom %≤V≤2 atom %, 0 atom %≤Nb≤2 atom %, incidental impurities of ≤1.0 wt. %, at least 0.5 atom % of one or more of the elements Mo, Nb and V being present, and the rest Ni.

The molten mass may have a chromium content of 11 atom %≤Cr≤14 atom %. The upper limit of the boron content may also be reduced such that 4 atom %≤B≤6 atom %, preferably 4 atom %≤B≤5.5 atom %.

The invention also relates to the use of the brazing foil, which has a composition consisting essentially of 11 atom %<Cr≤16 atom %, 0 atom %≤Mo≤3.5 atom %, 4 atom %≤B≤7 atom %, 11 atom %≤Si≤16 atom %, 0 atom %≤P≤0.5 atom %, 0 atom %≤C≤0.85 atom %, 0 atom %≤Fe≤5 atom %, 0 atom %≤Co≤5 atom %, 0 atom %≤Cu≤2 atom %, 0 atom %≤V≤2 atom %, 0 atom %≤Nb≤2 atom %, incidental impurities of ≤1.0 wt. %, at least 0.5 atom % of one or more of the elements Mo, Nb and V being present, and the rest Ni, to produce a heat exchanger that comes into contact with drinking water during operation.

In this application the brazing foil may have a chromium content of 11 atom %≤Cr≤14 atom % and/or a boron content von 4 atom % s B s 6 atom %, preferably 4 atom %≤B≤5.5 atom %.

The sum of O and N in the form of incidental impurities may be less than 0.035 atom %.

The sum of glass-forming elements (also known as metalloids) may be 14 atom %≤(Si+B+P+C)≤20 atom %.

In some embodiments the brazing foil is at least 80%, preferably at least 90%, amorphous.

In some embodiments the brazing foil has a thickness d, where 20 μm≤d≤80 μm, preferably 30 μm to 70 μm, preferably 40 μm to 60 μm.

In some embodiments the brazing foil has a width of 1 mm to 300 mm, preferably 50 mm to 250 mm, preferably 80 mm to 250 mm.

In some embodiments the parts are made of a stainless steel that contains least 12 wt. % chromium and at least 0.5 wt. % molybdenum.

In a further embodiment the composition of the stainless steels is further defined such that the parts are made of a stainless steel that contains at least 15 wt. % chromium and/or 1.3 wt. % to 3 wt. % molybdenum.

In some embodiments the parts are made of a DIN 1.4404 or DIN 1.4401 stainless steel.

In some embodiments the parts take the form of a plate, a circuit board sheet metal profile, a pipe or a corrugated sheet.

A plate heat exchanger according to the invention for drinking water or other foodstuff applications has the following advantages and properties:

It withstands an internal pressure of at least 80 bar without the need to fit a special retaining frame around the brazed heat exchanger.

It resists attack from commonly used drinking water qualities.

There is no release of high levels of heavy metals into drinking water flowing over or stagnating in it, even over long periods.

The quantity of heavy metal ions released by plate heat exchangers of this type is significantly lower than that of heat exchangers usually produced using copper or nickel brazing foils such as Ni661 in this field of technology; the quantity should preferably be at least halved.

There is no need to coat water-contacting surfaces; this has a positive effects in terms of the cost efficiency of the production process.

No subsequent heat treatment of the heat exchanger is; this has a positive effects in terms of the cost efficiency of the production process.

A heat exchanger produced according to the invention is able to meet the required hygiene and mechanical standards immediately after the brazing process.

One embodiment provides for a method for the provision of a brazed heat exchanger made from X5CrNiMo17-12-2 (1.4401/AISI 316) austenitic stainless steel that is characterised by the fact that it releases very few heavy metal ions into drinking water flowing past or stagnating in it. The plate heat exchanger according to the invention is produced by vacuum brazing using a NiCrMo-based amorphous brazing foil and has a water-contacting inner surface area of approx. 0.5 to 2.5 $m^2/l$. The material thickness of the stainless-steel plates is between 0.1 and 0.5 mm. The method comprises (a) producing punched and stamped stainless-steel plates; (b) producing braze preforms from a NiCrMo-based amorphous brazing foil according to the invention by means of punching, cutting to length and/or bending; (c) forming a plate stack in which the braze preforms are inserted between the stainless-steel plates; (d) brazing the plate stack in a vacuum brazing furnace at a temperature approx. 50° C. above the liquidus temperature of the braze and maintaining the temperature above 1100° C. for more than 30 minutes; (e) cooling the plate stack in the furnace in a vacuum or inert gas to produce a permanent joint.

The heat exchanger according to the invention, which is produced using a brazing foil according to any one of the embodiments, acquires its good material properties immediately after the brazing process and requires no further treatment in order to exhibit low heavy metal release into drinking water or to produce high pressure resistance. Further treatments may include coating the inner surface or treatment with chemicals other than just drinking water. Simply rinsing the components with drinking water for no more than 24 hours is permissible. The subsequent fitting of retaining frames to improve mechanical stability is also not required.

In addition, there is provided a brazed plate heat exchanger made of a stainless steel such as X2CrNiMo-17-12-2, that meets statutory, physical, electrochemical, electrochemical and economic requirements and complies with the hygiene requirements of modern drinking water networks. The heat exchanger according to the invention and components thereof are characterised by the fact that the water-contacting surfaces are ready for use immediately after the brazing process and that they can be placed in drinking water without any further treatment.

Many established material concepts used in components of drinking water systems such as galvanized steel pipes, nickel-plated valve seats in fittings or copper-brazed stainless steel radiators, for example, can be replaced or modified. X5CrNiMo17-12-2 (DIN EN 1.4401/AISI 316) austenitic steel has now become the standard metal material used in pipes and systems that carry drinking water in drinking water systems. This material is particularly hygienic and releases no significant quantities of heavy metal ions into the water it carries. This material is used as the reference material in the standards relating to drinking water systems. If heat treatments at temperatures above 600° C., such as welding or brazing, need to be carried out on these systems and components then X2CrNiMo17-12-2 (DIN EN 1.4404/AISI 316 L), a somewhat higher-quality material, is used. The only real difference between the two is that the latter has somewhat lower carbon content, but it has a notably positive effect on corrosion. It has also become the standard material for the production of high-temperature-brazed components of drinking water systems.

Plate heat exchangers made of 1.4404, which have joints in which copper has been used as the brazing material, currently represent the majority of industrially mass produced exchangers and are used for applications that do not have particularly high corrosion requirements.

Braze in the form of amorphous foils are established products in the industrial mass production of heat exchangers and plate heat exchangers. These foils are placed between the steel parts to be joined in the form of cut-to-length or punched foil sections, which can also be bent into three-dimensional braze preforms, to produce cohesive connections in high-temperature brazing processes. The use of a brazing foil makes manufacturing processes easy to automate and so cost efficient. In addition, due to the exact foil thickness of the brazing foil it is possible to measure out the necessary quantity of braze into the brazing bap with great accuracy. This has very positive effects on the safety of heat exchanger manufacture.

Brazed plate heat exchangers are very compact and are preferably used in domestic and refrigeration applications as well as in heating systems such as underfloor heating and solar installations, for example, as industrial coolers in mechanical engineering or as condensers or evaporators in refrigeration/air conditioning applications. In addition, plate heat exchangers of this type can be used in the foodstuffs industry for cooling milk or pasteurising beer, for example, or for heating household drinking water.

In the test methods used to verify the hygiene suitability of metal materials under the German Drinking Water Regulations, brazed components are left in drinking water and the increase in metal ions in the exposure water is then measured.

Alongside stainless steel heat exchangers that have been joined using nickelous brazing materials, nickel-free brazing materials such as pure copper, for example, also lead to extremely high nickel precipitations. The chemical composition of the brazing material is not, therefore, the only cause of the high nickel migration into the drinking water. Instead, the cause is in fact local chemical modification in the joint zone of the materials used that takes place due to diffusion-specific metallurgical processes as a result of the heat input during the joining process. The corrosion of metal materials is in most cases an electrochemical reaction, though in some cases it may be chemical or physical in nature. The corrosion phenomena observed in systems carrying drinking water are generally due to galvanic activity. This is also referred to as electrochemical corrosion or contact corrosion.

High-temperature brazed connections are highly complex multi-element metal systems, which, due to the metallurgical processes that occur during the brazing process, are able to form new and different crystal compositions or phases or mixed regions in a small amount of space that may then form galvanic corrosion elements in contact with water. Due to the plurality of chemical elements involved and the thermally induced metallurgical processes during brazing with the plurality of resulting potential compositions, it is difficult, not to say impossible, to predict which corrosion elements may occur.

One approach to providing materials with high corrosion resistance lies in giving them a high chromium content of over 10.5 wt. %. The higher the chromium content, the better the corrosion resistance. The chromium contents of corrosion-resistant steels are typically between 17 and 22 wt. %. In addition, care would conventionally be taken with brazing materials to ensure that the boron content of a braze with a comparatively high chromium content was as low as possible, preferably ≤1.5 wt. %. However, it has also been shown that even a brazing material with a low chromium content of 11 wt. % (VZ2106/Ni-35Fe-11Cr-1.5Mo-1Cu-6.3Si-1.5B wt. %), particularly in contact with drinking water, can also lead to less heavy metal precipitation than a brazing material containing 18% chromium (VZ2150/Ni-18Cr-7.3Si-1.2B wt. %). This result is very surprising.

The pitting (or PREN (Pitting Resistance Equivalent Number)) index is used to estimate the corrosion resistance of a chromic steel or a nickel alloy against selective corrosion such as pitting or crevice corrosion. In general, the higher the pitting/PREN index, the more corrosion-resistant the steel.

Calculation of the pitting index (PI) reveals a lower pitting index for braze VZ2106 (11% Cr+1.5% Mo*3.3=PI 16) than for braze VZ2150 (=PI 18). The ability of such alloys to protect against these forms of corrosion depends on the contents of chromium, molybdenum and in some cases nitrogen in the alloys. These alloy elements cause a passivation of the metal and so provide protection. If the passive layer is insufficient, the metal is attacked. In general terms, the more aggressive the medium, the higher the chromium content must be. After chromium, molybdenum is also an important alloy element. In general terms, the higher the pitting/PREN index, the more corrosion-resistant the steel.

The pitting index for high-alloyed stainless steels is calculated as follows:

$$PI = \% \ Cr + 3.3 * \% \ Mo + 16 * \% \ N$$

This advantageous behaviour of an alloy with a relatively low chromium content of 11% was completely unexpected for the inventor. The nickel ion release when using copper as the brazing material was equally unexpected. These results show how complex and difficult to predict the mechanisms behind the nickel ion release of brazed stainless steel components are.

One possible method of achieving low nickel precipitation from brazed stainless steel components into drinking water could be to use an iron-chromium braze containing as little nickel as possible. Here, too, however, it remains to be demonstrated that the nickel content of the base material (austenitic CrNi steel) is not released from the material joints due to the reactions occurring during high-temperature brazing, as can be observed in brazed connections between CrNi steel and copper, for example. There is, however, no commercially available nickel-free FeCr brazing foil that can be produced in the desired foil dimensions of approx. 30-60 µm thickness and >150 mm foil width because amorphous brazing foils with high iron contents tend to high levels of brittleness and these brittle foils cannot be used to produce braze preforms.

The commercially available iron-based brazing systems may either be alloyed in situ from individual alloy system components in powder form during the brazing process, as disclosed in EP2446996B1, for example, or are used as ready-made brazing pastes such as those disclosed in U.S. Pat. No. 8,287,805 and EP1347869B1. In general, however, iron-based alloy systems have a higher melting point than nickel-based systems and so may result in higher brazing temperatures of over 1200° C. These high brazing temperatures can have a disadvantageous effect on the microstructure of the base material since they lead to grain growth that manifests itself in poor mechanical plate heat exchanger properties. These may be countered either by using the in situ process for alloying the braze components described above at temperatures below 1200° C. or by the addition of phosphorus to the brazing material. However, significant phosphorus contents in the brazing material or the base material drastically impair the mechanical properties of the materials and the components made from them, which in turn manifests itself in the form of fluctuating and partially very low pressure resistances in the heat exchangers. As heat exchangers that are connected to the drinking water network must sometimes withstand pressures of 80 bar (European Pressure Equipment Directive—PED 2014/68/EU), phosphoric brazing materials can only be used if the heat exchanger is fitted in an additional metal frame that stabilises the plate heat exchanger and is able to absorb these pressures. However, a reinforcing frame of this type is undesirable since it significantly increases the cost of the heat exchanger in comparison to competitor products. Even if a retaining frame is used, it is impossible to guarantee that individual brazing points will not fail due to mechanical load, e.g. brazed threaded connections. For these reasons, the use of phosphoric brazes is not desirable in this field.

However, no iron-based amorphous brazing foils that are also phosphorus-free are available in commercial quantities.

The invention therefore provides for nickel-based brazing materials and brazing processes that result in components that reliably comply with the limit values set out in the German Drinking Water Regulations and release as few heavy metal ions as possible into the drinking water, while at the same time having high pressure resistance and being capable of being produced cost efficiently. To this end, optimised brazing materials, in particular, in the form of wide amorphous foils, in particular, that can be shown not to result in significant nickel ion precipitation from the components it into the drinking water are desirable.

BRIEF DESCRIPTION OF THE DRAWINGS

Embodiments are described in greater detail below with reference to the drawings and examples.

DETAILED DESCRIPTION OF EXAMPLE EMBODIMENTS

According to the invention there is provided a brazing foil that is preferably ductile. In one embodiment the brazing foil has a composition consisting essentially of 11 atom %<Cr≤16 atom %, 0 atom %≤Mo≤3.5 atom %, 4 atom %≤B≤5.5 atom %, 11 atom %≤Si≤16 atom %, 0 atom %≤P≤0.5 atom %, 0 atom %≤C≤0.85 atom %, 0 atom %≤Fe≤5 atom %, 0 atom %≤Co≤5 atom %, 0 atom %≤Cu≤2 atom %, 0 atom %≤V≤≤2 atom %, 0 atom %≤Nb≤2 atom %, incidental impurities of ≤1.0 wt. % and the rest Ni.

In a further embodiment, the brazing foil has a composition consisting essentially of 11 atom %<Cr≤16 atom %, 0 atom %≤Mo≤3.5 atom %, 4 atom %≤B≤7 atom %, 11 atom %≤Si≤16 atom %, 0 atom %≤P≤0.5 atom %, 0 atom %≤C≤0.85 atom %, 0 atom %≤Fe≤5 atom %, 0 atom %≤Co≤5 atom %, 0 atom %≤Cu≤2 atom %, 0 atom %≤V≤2 atom %, 0 atom %≤Nb≤2 atom %, incidental impurities of ≤1.0% w/, at least 0.5 atom % of one or more of the elements Mo, Nb and V being present, and the rest Ni.

The upper limit of the chromium content can be reduced such that 11 atom %≤Cr≤14 atom % and the upper limit of the boron content can be reduced such that 4 atom %≤B≤6 atom %, preferably 4 atom %≤B≤5.5 atom %.

Mo may be present in both embodiments, with 0.5 atom %≤Mo≤3.5 atom %.

The brazing foils according to the invention are ductile even at the relatively large foil thicknesses suitable for the production of typical plate heat exchanger dimensions. Hard-brazing foils can be produced by means of rapid solidification technology in casting widths of at least 80 mm to 150 mm, preferably up to approx. 250 mm. A suitable braze quantity for this application is approx. 300 g braze per square metre of mating surface, which corresponds to a mean brazing foil thickness of approx. 40 µm. If the mean foil thickness is smaller, the pressure resistances of the heat exchanger decrease in an undesirable manner and leaks may occur due to the low quantity of braze. Amorphous foils with a nominal mean thickness of 40 µm are manufactured with a mean thickness tolerance of approx.+/−5 µm. The maximum mean thickness is thus approx. 45 µm. In addition to the maximum mean thickness, other narrowly limited, local thickness deviations that can be measured via the strip cross section may occur. Examples are spots, corrugations, scoring and wedge shapes that may project clearly above the mean thickness locally. Local thickness deviations of this type are tolerated as maximum foil thicknesses or envelopes with a maximum deviation of approx.±15 µm. Even at these maximum-thickness strip points the foil is ductile and can still be cut and punched without exhibiting brittleness.

Since the foil thickness itself reduces the cooling conditions of regions of the foil distant from the casting wheel, stronger characterisation of brittle regions within the foil can be expected as foil thickness increases, if all other process conditions remain constant. Since larger regions of brittle areas in the foil are problematic for punching and bending work during production of the braze preforms, the foil thickness at which ductility is ensured for least approx. 95% of the foil surface, referred to here as $D_{max}^{D95}$, should be at least approx. 55 µm.

Figure 1:
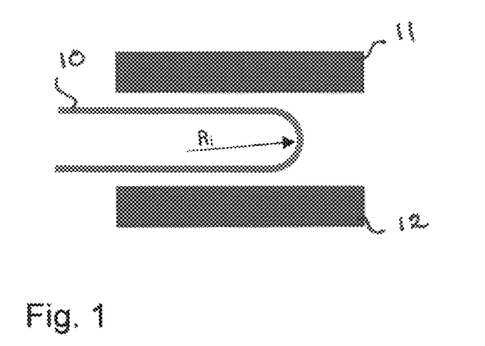
FIG. 1 shows a schematic view of an arrangement for performing a bending test.

Here, brittleness is examined by means of a bending test, from which the parameter $D_{max}^{D95}$ is determined. FIG. 1 shows an arrangement for performing a bending test. In the bending test the brazing foil 10 is compressed at 180° with sharp edges. If the foil 10 can be compressed with sharp edges over its entire width without breaking, the material is ductile.

To perform a bending test, the amorphous foil 10 is folded transversely by 180° until the inner radius ($R_i$) of the resulting strip loop is 0 "zero". To this end, the foil loop can be pressed onto a base plate 12 with a force great enough to press the strip layers against one another with no air gaps by means of a stamp 11, for example, that is wider than the width of the foil.

These tests are performed at least 10 times on a sample length of approx. 3 m. No brittle fractures should occur in which the sum of the fracture lengths exceed more than 5% of the total sum of all bending fold lengths.

Figure 2:
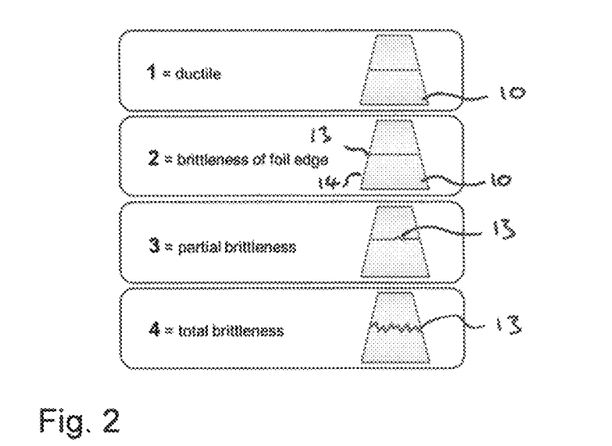
FIG. 2 shows a schematic view of the evaluation of a tear test.

A tear test is also performed. In the tear test, the strip is torn by hand obliquely in relation to the strip. Brittle regions tears and splinters show a characteristic, irregular course of the torn edge. The tests should be performed 10 times on a sample length of approx. 3 m. The results of the tests can be categorised into four classes, as illustrated in FIG. 2.

(1) Completely ductile: no brittle crack regions occurring.
(2) Strip edge brittleness: brittle crack regions 13 occur at the strip edge 14.
(3) Partial brittleness: brittle crack regions 13 occur in various regions of the strip cross section.
(4) Completely brittle: the foil contains brittle tears.

These tests are performed at least 10 times on a sample length of approx. 3 m. No brittle fractures should occur in which the sum of the fracture lengths exceed more than 5% of the total sum of all tear sample lengths.

The brazing foil should be almost completely ductile up to a thickness of at least approx. 55 µm so that preforms for use in a plate heat exchanger can be shaped by cutting or punching them out of the foil. Due to the chromium content of more than 10%, this is only possible with nickel-based brazing foils. Iron-based FeCr brazing foils with a low boron content cannot be produced in the necessary foil dimensions without brittleness. Cobalt can be excluded as a basis for CoCr brazing foils both on cost grounds and due to toxicological considerations. Copper-based alloys do not achieve the necessary corrosion resistance.

To produce an object such as a plate heat exchanger for drinking water applications with at least one braze seam, the brazing foil is inserted between two or more parts to be joined, the parts to be joined having a higher melting temperature than the brazing foil in order to make a brazed joint. The brazed joint is heated to a brazing temperature that is above the liquidus temperature of the braze and below the melting temperature of the parts. The brazed joint is cooled to form a brazed connection between the parts and a brazed connection is thus formed between the parts.

The brazed connection produced with the brazing foil according to the invention has a high tensile strength. Since the brazed heat exchanger must meet the requirements of the European Pressure Equipment Directive (PED 2014/68/EU) and withstand a maximum pressure of up to 80 bar in order to be approved for the relevant applications, it is necessary to select brazing materials that withstand breaking strengths significantly above the yield strength (Rp0.2) of the base material 1.4404. This is approx. 250 N/mm². It is also desirable for these heat exchangers not to exhibit brittle facture behaviour and so not to break suddenly. A brittle fracture occurs at low strains and generally close to the yield point. Since it is desirable in heat exchangers for mechanical failure to be preceded by small cracks and deformations in the heat exchanger, it is also necessary for the brazed connection to achieve an elongation at break of at least approx. 5% and a tensile strength of at least approx. 350 N/mm² (100 N/mm² above the 1.4404 yield strength of 250 N/mm²).

These mechanical requirements mean that phosphoric brazing alloys are unsuitable for plate heat exchangers for drinking water applications. A comparative example of a phosphoric braze with a high chromium content is disclosed as embodiment A5. Table 3 shows the low tensile strength of approx. 230 N/mm².

The brazing foil according to the invention ensures low heavy metal release levels without additional processes. A decisive value for the heavy metal release of medium-carrying metal components into media such as drinking water, for example, is the ratio between the media-wetted metal surface and the volume of media contained. This ratio plays a decisive role in determining the quantity of heavy metals released into a given volume of. medium. This is therefore the ratio considered when comparing the results of different components or test pieces. For brazed plate heat exchangers this value is typically approx. 0.5 to 2.5 m²/l of the fluid medium, i.e. in this case per litre of drinking water. Brazed stainless steel structures produced with the NiCrMo brazing foils according to the invention thus release significantly fewer heavy metal ions into the wetting drinking water.

Due to the good wetting and flow properties characteristic of all brazing materials and the surface application of the braze, after the brazing process a large part of the inner surface of the heat exchanger will be wetted by the brazing material as long as the atmosphere in the brazing process had a sufficiently low partial oxygen pressure, a condition which is generally met in vacuum brazing processes. With vacuum-brazed plate heat exchangers, the entire inner surface of these components is therefore typically wetted with brazing material. This is shown by way of example in FIGS. 3 and 4 of samples P1-A3 (VZ2150) and P1-K1 (copper). They show that the brazing material (copper) has covered the entire inner surface with a thin film of copper. With the nickel braze, a full shiny metal coating of the inner surface of the brazed sample can also be seen.

In the stagnation test with typical German drinking water, a component made of the base material 1.4404 or a similar material and brazed according to the invention with a water-contacting surface of more than 0.2 m²/l has at least 25% less heavy metal precipitation than components made with commercially available amorphous Ni-based brazing foils that can be produced industrially in mean foil thicknesses of at least 40 µm and in foil widths of over 120 mm to approx. 250 mm.

In the dynamic test bench experiment according to DIN EN 15664 with cold test water number 1, plate heat exchangers or similar components made from the base material 1.4404 or a similar material and brazed according to the invention that have a water-contacting surface of 1-2 m²/l show a level of nickel migration that is significantly below 20 µg/l at stagnation times of up to 16 hours.

Tests and Results

A comparison of test series 1 (comparative examples) and 2 (examples according to the invention) shows the better resistance to drinking water of the base material/braze material combination according to the invention. Test series 3 and 4 also show the better suitability of the brazing foil according to the invention for the processing operations that occur during heat exchanger production. Test series 5 shows that the requirements of the German Drinking Water Regulations can be met without difficulty with the heat exchangers according to the invention.

Test series 1: Commercially available brazing foils are tested as comparative examples, the test samples each having a water-contacting area of 0.23 m²/l.

First, brazing materials in foil form are tested for their general suitability for the production of plate heat exchangers and in particular to ascertain heavy metal migration in the 1.4404 samples made with these brazing materials in wetting drinking water.

Table 1 shows the comparative brazing foils tested. In addition to the chemical composition in atom % and wt. %, it also lists the maximum possible ductile strip thicknesses ($D_{max}^{D95}$) and the maximum industrially mass produced widths that are commercially available for these compositions.

The need for foils that are available in strip thicknesses of 55 µm and foil widths of at least 80 mm to over 150 mm for plate heat exchangers can only be met with alloys A2, A4 and A7. Although many of the commercially available foils have small foil dimensions, heavy metal migration to drinking water tests were nevertheless performed on brazed joints made with them.

To this end, brazed test samples emulating the surface conditions of a typical plate heat exchanger were produced. This was done using stamped stainless steel circuit boards made of the material 1.4404/AISI 316 L from industrial cooler production. Blanks measuring 25 mm×40 mm with the same rib structure as the plate heat exchanger boards were cut from the circuit boards by electrical discharge machining. The rib structure has a distance between corrugations of 7 mm, a corrugation height of 2 mm, a corrugation angle of 30° and a sheet thickness of 0.25 mm. The blanks were cleaned in an ultrasonic bath, first in soapy water for 15 minutes and then in isopropanol for 15 minutes, and then dried in the air at room temperature.

Table 1 shows commercially available amorphous comparison brazing foils.

50 µm-thick amorphous brazing foil preforms produced in the required thickness were used as the brazing material for alloys A2, A4 and A7 only, while two layers of 25 µm-thick brazing foils were used for alloys A1, A3, A6, A8, A9 and A5. A 50 µm-thick classic copper brazing foil was also used as reference brazing material K1. The brazing foils were shaped with a punching tool to dimensions of 40 mm×25 mm and then cleaned in isopropanol in an ultrasonic bath for 15 minutes. Seven metal blanks were then stacked with alternating rib orientations and with a brazing foil insert between each layer, i.e. six brazing foil blanks per sample, so as to produce a sample with a total height of ~16 mm. This sample was fitted into a holder made of 1.4401 and aluminium oxide to ensure that the material blanks remained precisely oriented in relation to one another during the brazing process, as shown in in FIG. 3.

Figure 3:
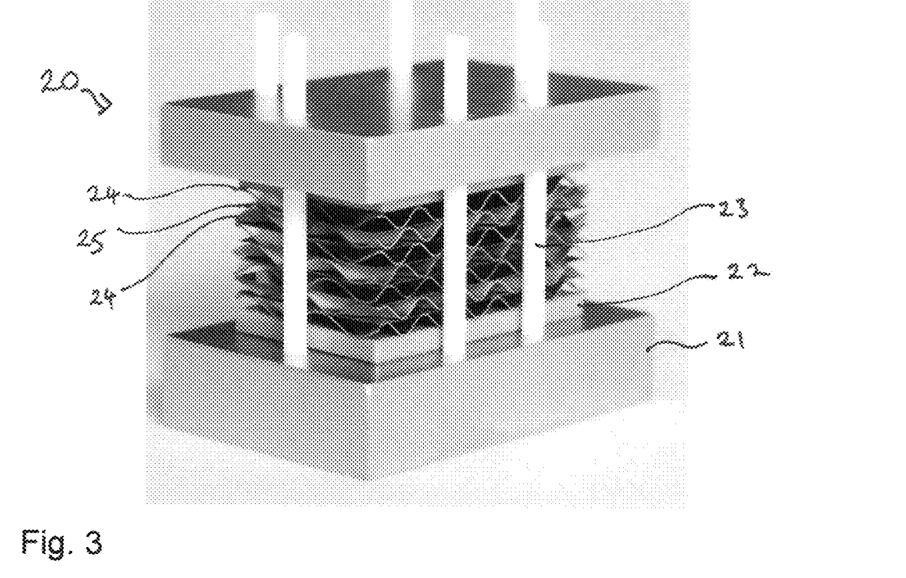
FIG. 3 shows a device for holding the sample in place during the brazing process.

The device 20 for holding the sample in place during the brazing process has a base plate 21 made of 1.4301 steel, for example, a ceramic plate 22 made of Al₂O₃, for example, rods 23 made of Al₂O₃, for example, as side guides, heat exchanger plate portions 24 and the brazing foil 25.

To keep the brazing gap as small as possible, the stack of plates was weighted down with a load of approx. 400 g during brazing. Aluminium oxide (plate and rods) was selected as the material of the brazing holder that comes into direct contact with the sample in order to prevent any contamination of the sample with other elements and avoid brazing the sample to the holder. The samples were brazed in a vacuum brazing furnace in a vacuum of approx. $10^{-4}$ mbar. The brazing temperatures and times for the various brazes are given in Table 1.

Figure 4:
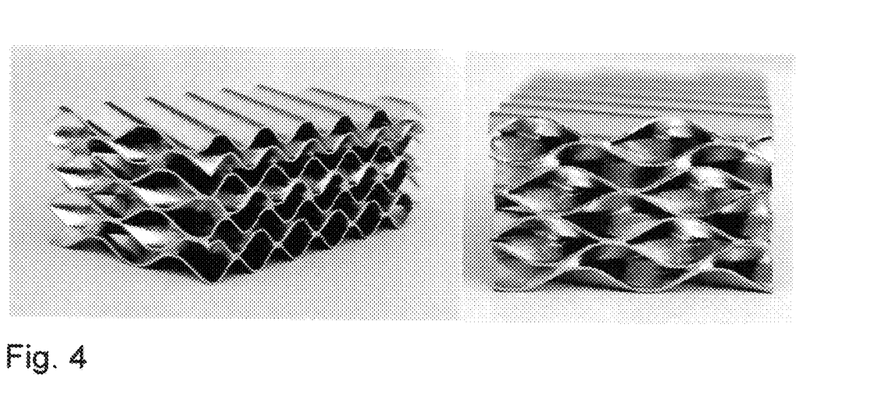
FIG. 4 shows a macroscopic view of sample P1-A3 after brazing.

A sample produced in this manner has approx. 144 brazed spot connections (24 per layer), which can be seen clearly in FIGS. 3 and 4. FIG. 3 shows a macroscopic view of sample P1-A3 after brazing with VZ2150 as the brazing material. FIG. 4 shows a macroscopic view of sample P1-K1 after brazing with copper as the brazing material.

The sample has a water-contacting surface area of 165 cm², approx. 140 mm² of which are wetted with braze. The weight of a sample is approx. 18.35 g. The sample is based on the structure of a heat exchanger. Exposure in 60 ml of drinking water creates a water-contacting area of 0.23 m²/l drinking water.

TABLE 1

| Comparison foil | | Chemical composition in wt. % and atom % | | | | | | | | $D_{max}^{D95}$ | $B_{max}$ |
|---|---|---|---|---|---|---|---|---|---|---|---|
| Sample# | braze | Ni | Fe | Cr | Mo | Cu | Si | B | X | [µm] | [mm] |
| A1 | Ni610 | 75.5 | 4.2 | 13 | | | 4.5 | 2.8 | | 40 | 150 |
|  |  | 63.3 | 3.7 | 12.3 | | | 7.9 | 12.8 | | | |
| A2 | Ni620 | 82.4 | 3 | 1 | | | 4.5 | 3.1 | | 75 | >150 |
|  |  | 68.8 | 2.6 | 6.6 | | | 7.9 | 14.1 | | | |
| A3 | VZ2150 | 73.3 | — | 18.2 | | | 7.3 | 1.2 | | 40 | 110 |
|  |  | 63.4 |  | 17.8 | | | 13.2 | 5.6 | | | |
| A4 | Ni661 | 76.3 |  | 15 | | | 7.3 | 1.4 | | 55 | >150 |
|  |  | 65.7 |  | 14.6 | | | 13.1 | 6.6 | | | |
| A5 | VZ2177 | 67.0 |  | 25 | | | 1.5 | 0.5 | P 6 | 40 | 120 |
|  |  | 59 |  | 25.8 | | | 2.8 | 2.4 | P 10 | | |
| A6 | MBF-53 | 71.3 |  | 15 | 5 | — | 7.3 | 1.4 | | 40 | 110 |
|  |  | 62.4 |  | 14.8 | 2.7 |  | 13.4 | 6.7 | | | |
| A7 | VZ2188 | 72.6 | 8.2 | 7.3 | 3 | | 6.7 | 2.2 | | 60 | >150 |
|  |  | 61.9 | 7.4 | 7 | 1.6 | | 11.9 | 10.2 | | | |
| A8 | Ni612 | 81.3 |  | 15 | | | | 3.7 | | 40 | 70 |
|  |  | 68.7 |  | 14.3 | | | | 17 | | | |
| A9 | VZ2106 | 43.7 | 35 | 11 | 1.5 | 1 | 6.3 | 1.5 | | 35 | 80 |
|  |  | 36.9 | 32 | 11 | 0.8 | 0.8 | 11.5 | 7 | | | |
| K1 | Cu102 |  |  |  |  | 100 |  |  | | n.a. | n.a. |

The samples are exposed in local drinking water (inner city waterworks, 63654 Hanau, Germany (hard water/pH 7.9/electrical conductivity 637 μS/cm) for an exposure period of 360 hours. The heavy metal load of the sample water is then determined using ICP-OES (Inductively Coupled Plasma Optical Emission Spectrometry). The detection limit of this measuring method is 5 μg/l for nickel and iron and 3 μg/l for copper. To remove the water, after 10 minutes or rinsing an appropriate quantity of several litres is drawn from the water pipe, from which all the sample cups and the reference sample are then filled. The material samples are individually completely covered with 60 ml of water in a closable cup made of polyethylene (see FIG. 2). The sample surface is cleaned and activated by exposing it to the water for 24 h at room temperature. These water samples were then disposed of. The measurement phase then began. The samples and die sample cups are rinsed with new water and then filled with 60 ml of water. The sample cups are then left in a refrigerator at 25° C. for 360 hours (15 days). A heavy metal analysis is then performed on each water sample and the reference water.

The heavy metal migration values are given in Table 2. The tests show that the water-contacting surface of heat exchanger structures of this type now show barely any stainless steel but rather take the form of a product of the reaction of the braze with the base material, which may have a different composition depending on various reaction conditions (chemistry, temperature, time).

Table 2 shows the heavy metal migration of the elements Ni+Fe+Cu (Ni) in sample 1 (P1) in drinking water for a stagnation period of 360 hours per test cycle over 5 consecutive test cycles and the mean values for the five test cycles. P1 has a water-contacting surface of 0.23 m²/l and was left in 60 ml drinking water at room temperature.

TABLE 2

| Braze sample | Heavy metal release - Ni + Fe + Cu (Ni) - per test cycle in μg/l | | | | | |
|---|---|---|---|---|---|---|
| | 1 | 2 | 3 | 4 | 5 | Mean |
| P1-A1 | 2174 (2100) | 925 (901) | 1820 (1802) | 3830 (3800) | 1452 (1400) | 2040.2 (2011) |
| P1-A2 | 5783 (5620) | 610 (610) | 210 (210) | 330 (330) | 899 (890) | 1566.4 (1532) |
| P1-A3 | 35 (25) | 14 (7) | 0 | 0 | 0 | 9.8 (6.4) |
| P1-A4 | 80 (40) | 34 (14) | 18 (10) | 12 (6) | 0 | 28.8 (14) |
| P1-K1 | 1030 (310) | 1011 (400) | 801 (250) | 710 (240) | 820 (320) | 874.4 (304) |
| P1-A6 | 16 (10) | 7 (0) | 0 | 0 | 0 | 4.6 (2) |
| P1-A7 | 2864 (2200) | / | / | / | / | / |
| P1-A8 | 1325 (1300) | 1281 (1200) | 457 (410) | 672 (620) | 645 (589) | 876 (824) |
| P1-A9 | 16 (7) | 0 | 0 | 0 | 0 | 4.2 (2.4) |
| P1-A5 | 474 (462) | 20 (20) | 10 (10) | 5 (5) | 0 | 101.8 (99.4) |

The brazed connections tested show significant differences in nickel ion release, which can exceed 5600 μg/l per test cycle. Even the heat exchanger sample brazed with pure copper emitted an average of 304 μg/l nickel and, if the elements copper and iron are added, reached a level of 874.4 μg/l heavy metal ions in the drinking water. With the nickel-based brazing materials, nickel ion release reduces significantly as the boron content decreases and the chromium content increases. However, a higher chromium content alone is not substantially responsible for the reduction in heavy metal migration. A comparison of samples P1-A8 (15Cr-3.7B wt. %) and P1-A4 (15Cr-1.4B wt. %) shows that the heavy metal migration in braze sample P1-A8 is approx. 100 times greater although the chromium content of the alloys is the same. The samples with strikingly small, single-figure values for heavy metal migration such as P1-A3 and P1-A6 would be very good candidates in terms of the hygiene properties of the brazed joint, however the amorphous foils cannot be produced in the required foil dimension of 55 μm thickness and >150 mm foil width without the foils becoming undesirably brittle.

Evaluation of the tensile strength of brazed connections produced with 1.4404 stainless steel as per Table 3 shows that most of the brazes tested are very largely able to meet the mechanical requirements of a tensile strength of ≤350 N/mm² and elongation at break of 5%. As expected, only the phosphor containing alloy A5 fails to meet these criteria, and this by some distance. If one considers all the requirements for the braze, the brazing foil and the brazed connection, as shown in Table 4, it is unfortunately clear that none of the material combinations from the prior art are able to fully meet the requirements of the heat exchanger industry.

Table 3 shows tensile strengths and elongation at break of the brazed joints made from standard brazes and the base material 1.4404 measured on blunt brazed tensile samples according to DIN EN 12797.

TABLE 3

| Brazing material | Brazing temperature T (° C.) | Dwell time t (min) | Tensile strength Rm (N/mm²) | Elongation at break A (%) |
|---|---|---|---|---|
| A1 | 1190 | 60 | 410 | 10.8 |
| A2 | 1090 | 60 | 356 | 5.9 |
| A3 | 1190 | 60 | 539 | 32 |
| K1 | 1100 | 10 | 370 | 31 |
| A7 | 1090 | 60 | 333 | 4.5 |
| A9 | 1190 | 60 | 523 | 39 |
| A5 | 1080 | 60 | 236 | 0.4 |

Table 3 shows the tensile strengths of the brazed joints made with the comparative braze/1.4404. Though sample P1-A4 is the only one produced using a foil that can be produced in the necessary dimensions, it does not exhibit single-figure values for heavy metal migration. A further indication, aside from the low boron content, comes from the comparison of samples P1-A4 (15Cr-1.4B) and P1-A6 (15Cr-5Mo-1.4B). Sample P1-A6 is one of the samples with the lowest heavy metal migration in the test. Although alloy A6 has the same chromium and boron contents as alloy A4 and differs from sample P1-A4 only in its molybdenum content of 5%, this sample shows a 6 times greater heavy metal migration. In a comparison of sample P1-A6 with the sample brazed with copper (P1-K1), the copper-brazed sample shows an approx. 200 times greater heavy metal migration.

Table 4 gives an overview of the criteria that the brazing foil according to the invention should meet for use in heat exchangers for drinking water applications:

Availability of foil with a ductile fracture behaviour over at least 95% of the surface ($D_{max}^{D95}$) at a mean foil thickness of (1a)≥55 μm and a foil width of (1b)≥150 mm.

Brazeability of materials at maximum 1200° C. and brazing times ≥30 minutes.

Good mechanical strength of the brazed connections (3a) produced with tensile strengths Rm≥350 N/mm² at elongations at break A of (3b)≥5%.

In drinking water with a water-contacting surface of approx. 0.15-2.5 m²/l, the brazed joints produced should:
show regressive heavy metal migration and
not exceed a mean nickel migration of less than 10 μg/l within the first three months.

In Table 4, ● indicates fulfilled and ○ not fulfilled. None of these commercially available brazing foils fulfils all the conditions desired for the application at the same time.

Table 4: Criteria overview—(1) Availability of foil with a ductile fracture behaviour over at least 95% of the surface ($D_{max}^{D95}$) at a mean foil thickness of (1a)≥55 μm and a foil width of (1b)≥150 mm—(2) Brazeability of materials at maximum 1200° C. and brazing times 30 minutes—(3) Mechanical strength of the brazed connections (3a) produced tensile strengths—Rm≥350 N/mm² at elongations at break—(3b) A of ≥5%. In drinking water with a water-contacting surface of approx. 0.15-2.5 m²/l, the samples of the brazed joints produced should show a (4) regressive heavy metal migration and (5) not exceed a mean nickel migration of less than 10 μg/l within the first three months.
*=samples produced with comparative foils.

cantly further than the lower limit of 6 atom % found in WO 02/22299 A1. On the other hand, reducing the boron content actually led to a reduction in brittleness and an improvement in the maximum foil thickness that can be produced, which is highly desirable for use in drinking water applications such as heat exchangers. For example, it can be seen from the reduction in the boron content of braze numbers B15→B2→B13 of contents 8.8 atom %→6.5 atom %→5.3 atom % that the maximum possible strip thickness increases from 29 μm→60 μm→64 μm.

Similarly, the molybdenum-free alloy B18 shows that that with boron contents of less than 7 atom % it is impossible to produce high strip thicknesses with sufficient ductility without molybdenum. As a result, the $D_{max}^{D95}$ values achieved are only 30 μm. With the alloy B13, on the other hand, which has a molybdenum content of 2.2 atom %, significantly higher $D_{max}^{D95}$ values of 64 μm can be achieved. In addition, B15 shows that higher boron contents, in this case 8.8 atom %, can result in a significant restriction of strip thickness that is less suitable for the application.

The tests showed that alloying with the element iron results in a significant decrease in the maximum possible strip thickness $D_{max}^{D95}$, as a result of which iron should be present in the composition only in very small quantities, if

TABLE 4

| Yes = ●<br>No = ○ | 1a<br>Thickness<br>>55 μm | 1b<br>Width<br>>150 mm | 2<br>Brazeable<br>≤1200° C. | 3a<br>Rm<br>>350 N/mm2 | 3b<br>A > 5% | 4<br>Regressive<br>heavy metal<br>release | 5<br>Ø Nickel<br>release<br><10 μg/l |
|---|---|---|---|---|---|---|---|
| A1* | ○ | ○ | ● | ● | ● | ○ | ○ |
| A2* | ● | ● | ● | ● | ● | ○ | ○ |
| A3* | ○ | ○ | ● | ● | ● | ● | ● |
| A4* | ● | ● | ● | ● | ● | ● | ○ |
| K1* | n.a. | n.a. | ● | ● | ● | ○ | ○ |
| A6* | ○ | ○ | ● | ● | ● | ● | ● |
| A7* | ● | ● | ● | ○ | ○ | ○ | ○ |
| A8* | ○ | ○ | ● | — | — | ○ | ○ |
| A9* | ○ | ○ | ● | ● | ● | ● | ● |
| A5* | ○ | ○ | ● | ○ | ○ | ● | ○ |

Test Series 2: Results with Brazing Foils According to the Invention and Brazed Joints Produced Using these Brazing Fails Table 5 shows the composition, ductility in the form of $D_{max}^{D95}$ and foil width $B_{max}$ of brazing foils with compositions according to the invention. Foils of the desired foil width and thickness can be produced in the chromium range from 11 atom % to 15 atom %. Surprisingly, it was found that the addition of molybdenum is advantageous for the application and that the boron content of such alloys can be reduced significantly without any detrimental effect on foil production. The boron content could be reduced signifiat all. In addition, alloys of this type containing iron cannot be produced in large foil widths because they lead to spontaneous tears during foil production and so reduce the cost efficiency of the production process. It was possible to add further corrosion-inhibiting elements such as Cu, V and Nb in small contents of up to approx. 1.5 atom % with no detrimental effect on foil production.

Table 5 shows the production of amorphous foils with comparative compositions and compositions according to the invention. *=comparison foils.

TABLE 5

| Brazing foil | Chemical composition in wt. %<br>Atom % | | | | | | | | $D_{max}^{D95}$ | $B_{max}$ |
|---|---|---|---|---|---|---|---|---|---|---|
| Sample# | Ni | Fe | Cr | Mo | Cu | Si | B | X | [μm] | [mm] |
| B1* | 74.3 | | 13 | 2 | 2 | 7.3 | 1.1 | | 65 | >150 |
|  | 64.6 | | 12.9 | 1.1 | 1.6 | 13.4 | 5.3 | | | |
| B2 | 74.7 | | 13.1 | 3.7 | | 7.1 | 1.4 | | 60 | >150 |
|  | 65.5 | | 13 | 2 | | 13 | 6.5 | | | |
| B3* | 74.3 | | 13 | 2 | 2 | 7.3 | 1.4 | | 60 | >150 |
|  | 64.6 | | 12.8 | 1.1 | 1.6 | 13.3 | 6.6 | | | |
| B4* | 71.4 | | 15.2 | 1.9 | 1.2 | 7.1 | 1.4 | Nb1.8 | 42 | >150 |
|  | 62.5 | | 15 | 1 | 1 | 13 | 6.5 | Nb1 | | |

TABLE 5-continued

| Brazing foil Sample# | Chemical composition in wt. % / Atom % | | | | | | | $D_{max}^{D95}$ [μm] | $B_{max}$ [mm] |
|---|---|---|---|---|---|---|---|---|---|
| | Ni | Fe | Cr | Mo | Cu | Si | B | X | | |
| B5 | 74.3 | | 15 | 2 | | 7.3 | 1.4 | | 53 | >150 |
| | 64.4 | | 14.7 | 1.1 | | 13.2 | 6.6 | | | |
| B6 | 73.3 | | 15 | 2 | 1 | 7.3 | 1.4 | | 50 | >150 |
| | 63.6 | | 14.7 | 1.1 | 0.8 | 13.2 | 6.6 | | | |
| B7* | 72.3 | | 17 | 2 | | 7.3 | 1.4 | | 45 | <150 |
| | 62.5 | | 16.6 | 1.1 | | 13.2 | 6.6 | | | |
| B8 | 72.1 | 4 | 13 | 3.5 | | 6.4 | 1.05 | | 40 | <120 |
| | 64.2 | 3.8 | 13.1 | 1.9 | | 11.9 | 5.1 | | | |
| B9* | 64.6 | 6 | 16.5 | 3 | | 8.9 | 1.05 | | 25 | <120 |
| | 55.8 | 5.5 | 16.1 | 1.6 | | 16.1 | 4.93 | | | |
| B10* | 68.7 | 6 | 15 | 2.8 | | 6.5 | 1.04 | | 35 | <120 |
| | 60.9 | 5.6 | 15 | 1.5 | | 12 | 5 | | | |
| B11* | 62.4 | 6 | 16.5 | 2.7 | | 6.3 | 0.9 | Nb5.2 | 35 | <120 |
| | 56 | 6 | 17 | 1.5 | | 12 | 4.5 | Nb3 | | |
| B12* | 71.1 | 7.6 | 11 | 1.5 | 1 | 6.3 | 1.5 | | 52 | <150 |
| | 61.9 | 7 | 11 | 0.8 | 0.8 | 11.5 | 7 | | | |
| B13 | 74.6 | | 13 | 4 | | 7.3 | 1.1 | | 64 | >150 |
| | | | | 2.2 | | | | | | |
| | 66.1 | | 13 | | | 13.4 | 5.3 | | | |
| B14 | 75.0 | | 13 | 4 | | 7.3 | 0.9 | | 57 | >150 |
| | | | | 2.2 | | | | | | |
| | 66.7 | | 13.1 | | | 13.6 | 4.4 | | | |
| B15* | 73.4 | | 13.4 | 3.8 | | 7.5 | 1.9 | | 29 | >150 |
| | 62.7 | | 13 | 2 | | 13.5 | 8.8 | | | |
| B16 | 75.3 | | 13 | | | 7.3 | 1.2 | V1 | 60 | >150 |
| | 64.9 | | 12.8 | | | 13.3 | 5.7 | V1 | | |
| B17 | 73.7 | | 14 | 4 | | 7.3 | 1.0 | | 55 | >150 |
| | 65.4 | | 14.1 | 2.2 | | 13.6 | 4.8 | | | |
| B18 | 78.7 | | 13 | 0 | | 7.3 | 1.1 | | 30 | <120 |
| | 69 | | 12.9 | 0 | | 13.4 | 5.3 | | | |

Table 6 lists the heavy metal migration tests performed on samples brazed using the brazing foils shown in Table 5.

Table 6 shows the heavy metal migration of the elements Ni+Fe+Cu (Ni) from sample 1 (P1) to drinking water with a stagnation time of 360 h per test cycle over five successive test cycles and the mean values from the five test cycles. P1 has a water-contacting surface area of 0.23 m²/l and left in 60 ml drinking water at room temperature.

TABLE 6

| Brazing sample | Heavy metal release - Ni + Fe + Cu (Ni) - per test cycle in μg/l | | | | | |
|---|---|---|---|---|---|---|
| | 1 | 2 | 3 | 4 | 5 | Mean value |
| P1-B1* | 47 | 15 | 5 | 0 | 0 | 13.4 |
| | (47) | (15) | (5) | | | (13.4) |
| P1-B2 | 18 | 6 | 0 | 0 | 0 | 4.8 |
| | (18) | (6) | | | | (4.8) |
| P1-B3* | 178 | 12 | 10 | 0 | 0 | 40 |
| | (110) | (6) | (0) | | | (25.4) |
| P1-B4* | 60 | 0 | 0 | 0 | 0 | 12 |
| | (40) | | | | | (8) |
| P1-B5 | 126 | 18 | 15 | 0 | 0 | 31.8 |
| | (64) | (10) | (9) | | | (16.6) |
| P1-B6 | 130 | 19 | 8 | 0 | 0 | 31.4 |
| | (49) | (8) | (5) | | | (12.4) |
| P1-B7* | 78 | 54 | 13 | 10 | 0 | 31 |
| | (12) | (7) | (6) | (5) | | (6) |
| P1-B12* | 516 | / | / | / | / | / |
| | (430) | | | | | |
| P1-B13 | 16 | 6 | 0 | 0 | 0 | 4.4 |
| | (10) | (6) | | | | (3.2) |
| P1-B14 | <23 | 11 | 10 | 5 | 0 | 9.8 |
| | (23) | (11) | (10) | (5) | | (9.8) |
| P1-B15* | 104 | 64 | 17 | 6 | 5 | 39 |
| | (104) | (59) | (17) | (6) | (5) | (38) |
| P1-B16 | 35 | 11 | 0 | 0 | 0 | 10.2 |
| | (27) | 0 | | | | (8.4) |

The reduction of boron to contents of under 7 atom % results in a very marked reduction in heavy metal migration, which can be seen in practically all the samples—except sample P1-B15, which has the braze containing 8.8 atom % boron. Moreover, in low-boron alloys with a chromium content of >12 atom % the addition of molybdenum in contents >1 atom % further reduces heavy metal migration. In these samples the quantity of heavy metals in the sample water was negligible. Molybdenum contents of approx. 2 atom % appear optimum for foil production and represent the hygiene properties of the brazed connection, as shown by samples P1-B2, P1-B13 and P1-B14. As expected, the tests performed to examine the tensile strength of the joints produced using the experimental brazing materials also show consistently good mechanical properties, as resumed in Table 7. In summary, heat exchangers produced using these brazes can withstand very high burst pressures. The brazing foils and brazed connections producing using B2, B13, B14, B16 and B17, which meet all the technical and commercial requirements, deserve a particular mention.

Table 7 shows tensile strengths and elongations at break for the brazed joints produced using standard brazes and the base material 1.4404 measured on blunt brazed tensile samples according to DIN EN 12797.

TABLE 7

| Brazing material | Brazing temperature T (° C.) | Dwell time t (min) | Tensile strength - Rm (N/mm$^2$) | Elongation at break - A (%) |
|---|---|---|---|---|
| B2 | 1190 | 30 | 365 | 6.2 |
| B12* | 1190 | 60 | 437 | 10.4 |
| B13 | 1190 | 60 | 533 | 33 |
| B14 | 1190 | 30 | 373 | 6.3 |
| B16 | 1190 | 30 | 436 | 16.0 |

Table 8 shows a criteria overview for the brazing foils according to the invention.

(1) Availability of foil with a ductile fracture behaviour over at least 95% of the surface ($D_{max}^{D95}$) at a mean foil thickness of (1a)≥55 µm and a foil width of (1b)≥150 mm.

(2) Brazeability of materials at maximum 1200° C. and brazing times ≥30 minutes.

(3) Mechanical strength of the brazed connections (3a) produced—tensile strengths Rm≥350 N/mm$^2$ at elongations at break A of (3b)≥5%.

In drinking water with a water-contacting surface of approx. 0.15-2.5 m$^2$/l, the brazed joints produced should:

(4) show regressive heavy metal migration and (5) not exceed a mean nickel migration of less than 10 µg/l within the first three months.

In Table 8, ● indicates fulfilled and ○ not fulfilled.

Table 8: Criteria overview—(1) Availability of foil with a ductile fracture behaviour over at least 95% of the surface ($D_{max}^{D95}$) at a mean foil thickness of (1a)≥55 µm and a foil width of (1b)≥150 mm—(2) Brazeability of materials at maximum 1200° C. and brazing times ≥30 minutes—(3) Mechanical strength of the brazed connections produced (3a) tensile strengths—Rm≥350 N/mm$^2$ at elongations at break—A of (3b) ≥5%. In drinking water with a water-contacting surface of approx. 0.15-2.5 m$^2$/l, the samples of the brazed joints produced should (4) show regressive heavy metal migration and (5) not exceed a mean nickel migration of less than 10 µg/l within the first three months. *=samples produced with comparative foils.

Test Series 3

In this example complete plate heat exchangers made of 1.4404 were produced using standard brazing foils A3, A4, A9 and K1 (for compositions see Table 1) and mass production processes.

The copper braze K1 was stamped and punched at the same time as the stainless-steel plates and arranged between the stainless-steel plates.

Figure 5:
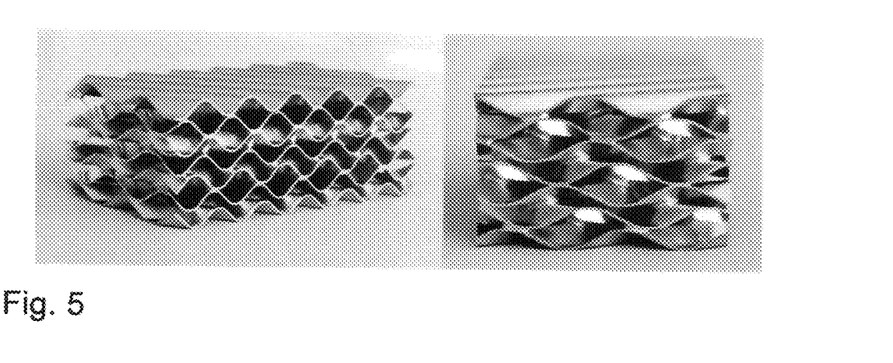
FIG. 5 shows a macroscopic view of sample P1-K1 after brazing.
Figure 6:
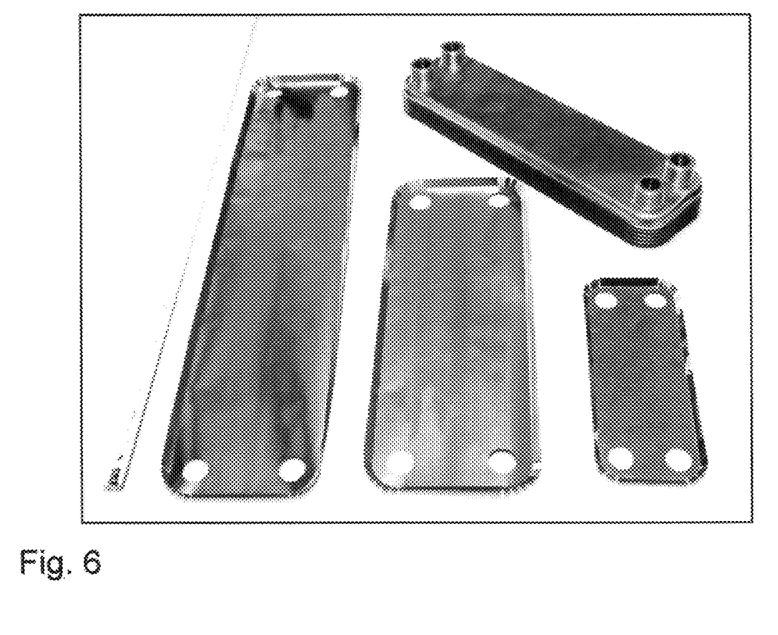
FIG. 6 shows examples of punched and stamped braze preforms made from the amorphous brazing foil.
Figure 7:
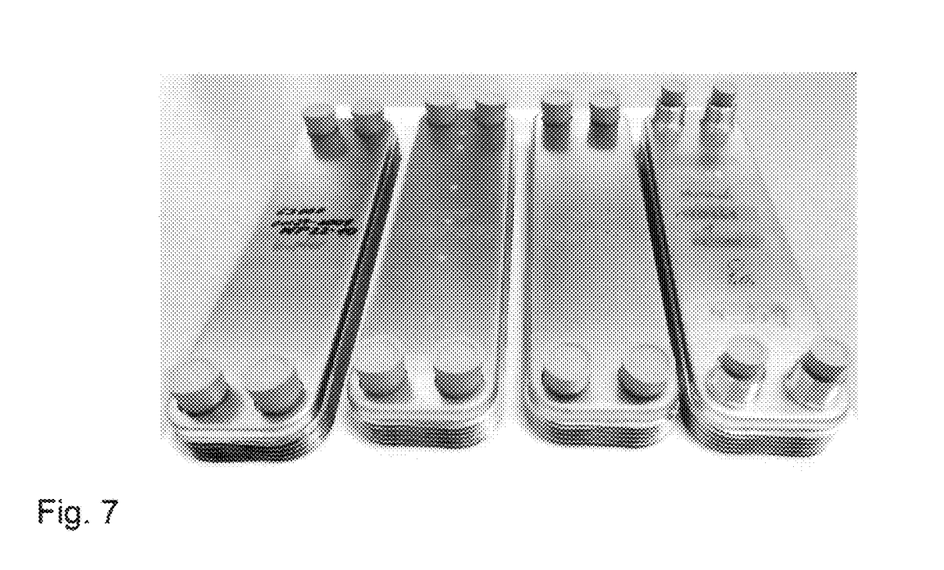
FIG. 7 shows a view of a water-filled heat exchanger during exposure.

To this end, the amorphous brazing foils were produced in dimensions of 108 mm foil width and a mean thickness of 40 µm±5 µm by rapid solidification. Since A9 was too brittle at 40 µm, this material was produced with a mean thickness of 35 µm. The foils were then cut to a width of approx. 98 mm and punched to make preforms. The strip edges of the preforms were then bevelled by approx. 70° to create three-dimensional braze preforms (see FIG. 5) that could be placed between the stamped steel plates. FIG. 6 shows punched and stamped braze preforms made of the amorphous brazing foil A9. On closer inspection, cracked foil regions are visible in the corners at the bevels.

During the punching and shaping processes, the foils made of A3 and A9 showed some failures due to the cracking of pieces of foil due to brittleness. Cracked punched and bent edges were observed on approx. 20% of the preforms produced. These damaged preforms are scrapped and reduce the cost efficiency of the process. Foils A3 and A9 with the required mean thickness of 40 µm±5 µm cannot be produced in the required brittleness class of $D_{max}^{D95}$.

Brazing foil A4 showed no problems or failures due to brittle strip areas or split strips. The braze preforms were arranged individually between punched and stamped heat exchanger plates made of 1.4404. The plate stacks were brazed in a vacuum furnace at a temperature of approx. 1195° C., maintained for approx. 1 hour. This produced 10-layer heat exchangers with dimensions of 90 mm×328 mm×37 mm that had a water volume of 0.414 litres and a water-contacting inner area of approx. 1.13 m$^2$/l.

The heat exchangers produced in this manner were subject to long-term exposure to drinking water (Hanau, Germany) with regular checking of heavy metal ion release into the sample water. For the test, after 15 minutes rinsing of the water pipe and several hours rinsing of the heat exchanger both circuits were filled with drinking water and tested according to the following scheme.

TABLE 8

| Yes = ● No = ○ | 1a Thickness >55 µm | 1b Width >150 mm | 2 Brazeable ≤1200° C. | 3a Rm >350 MPa | 3b A > 5% | 4 Regressive heavy metal release | 5 Ø Nickel release <10 µg/l |
|---|---|---|---|---|---|---|---|
| B1* | ● | ● | ● | — | — | ● | ○ |
| B2 | ● | ● | ● | ● | ● | ● | ● |
| B3* | ● | ● | ● | — | — | ● | ○ |
| B4* | ○ | ● | ● | — | — | ● | ● |
| B5 | ○ | ● | ● | — | — | ● | ○ |
| B6 | ○ | ● | ● | — | — | ● | ○ |
| B7* | ○ | ○ | ● | — | — | ● | ○ |
| B8 | ○ | ○ | ● | — | — | — | — |
| B9* | ○ | ○ | ● | — | — | — | — |
| B10* | ○ | ○ | ● | — | — | — | — |
| B11* | ○ | ○ | ● | — | — | — | — |
| B12* | ○ | ○ | ● | — | — | — | — |
| B13 | ● | ● | ● | ● | ● | ● | ● |
| B14 | ● | ● | ● | ● | ● | ● | ● |
| B15* | ○ | ● | ● | — | — | ● | ○ |
| B16 | ● | ● | ● | ● | ● | ● | ● |

1.) 4 hour sample: The plate heat exchanger is filled with fresh water and sealed tightly with a rubber stopper. A reference sample is also filled. After four hours at room temperature all the water is removed from both circuits and 250 ml of the sample are sent for analysis.

2.) 14 day exposure: The plate heat exchanger is filled with fresh water once a week, sealed tightly with a rubber stopper (see FIG. 6) and left at room temperature for 14 days. The water is disposed of.

Steps 1 and 2 above are repeated until the test has lasted for a total of three months.

For the analysis, all samples are acidified with 1 ml concentrated $HNO_3$ per 100 ml sample. The analysis for Ni, Co, Cr, Cu and Fe is carried out using ICP. The ICP detection limits are as follows: nickel is 5 ppb or µg/l; cobalt 3 ppb or µg/l; chromium 2 ppb or µg/l; copper 3 ppb or µg/l; and iron 5 ppb or µg/l. Contents below the detection limit are recorded as 0 (zero). The results of these water analyses are shown in Table 9. The qualitative result relating to the increase in quantity of heavy metal ions depending on the amorphous brazing foil used largely corresponds to the tests on the small samples (P1).

Table 9 shows the result of the heavy metal analyses in µg/l of Ni+Fe+Cu (Ni) in drinking water with a stagnation time of 4 hours, values from test weeks W1 ... W9 and the mean values (MW) from the five measurements.

TABLE 9

| | Heavy metal contents in µg/l at a stagnation time/period of 4 hours | | | | | |
|---|---|---|---|---|---|---|
| | W 1 | W 3 | W 5 | W 7 | W 9 | MW |
| PWT1-K1 | 998 | 1167 | 1229 | 1302 | 1139 | 1167 |
| | (570) | (430) | (122) | (110) | (99) | (266) |
| PWT1-A3 | 2743 | 480 | 255 | 168 | 222 | 774 |
| | (2300) | (400) | (178) | (101) | (90) | (614) |
| PWT1-A4 | 5724 | 626 | 394 | 302 | 268 | 1463 |
| | (5000) | (570) | (299) | (245) | (187) | (1260) |
| PWT1-A9 | 27 | 0 | 25 | 20 | 22 | 19 |
| | (16) | (0) | (5) | (0) | (0) | (4) |

Though the samples had already been rinsed in the drinking water for one day, the first 4 h stagnation sample for the heat exchanger with the nickel braze showed very high levels of heavy metal emissions of nickel, in particular, at 2300 µg/l for A3 and 5000 µg/l for A4, though this figure was approx. one order of magnitude lower in the following weeks. It was also shown that, apart from the measurement value for the first week, the heat exchanger produced with copper (K1) emitted more heavy metal ions than the heat exchangers produced using nickel brazes A3 and A4. Neither the plate heat exchanger brazed with copper nor the plate heat exchangers produced using nickel brazes A3 and A4 showed levels below nickel limit value of 20 µg/l. The excellent hygiene behaviour of brazing material A9 (VZ2106) in drinking water was, however, confirmed. In most samples from this plate heat exchanger practically no discernible nickel level could be shown although, as has already been mentioned on several occasions, brazing foils A3 and A9 are nevertheless unsuitable for the industrial mass production of plate heat exchangers of this type because it is impossible to achieve the required brittleness class at the necessary foil thicknesses.

Test Series 4: Tests with the Brazing Material According to the Invention

In this example complete plate heat exchangers were produced using brazing foil variant B13 and comparative brazing foil A4 under mass production conditions.

To this end, the amorphous brazing foils were produced in dimensions of 108 to 138 mm foil width and a mean thickness of 40 µm±5 µm by means of rapid solidification. Once cast, the foils were cut to a width of approx. 98 mm and then punched to produce preforms. The strip edges of the preforms were then bevelled by approx. 70° to create a three-dimensional braze perform (as in test series 3). Neither of the foils showed any brittleness or failures during the punching and shaping processes.

The braze preforms were arranged individually between punched and stamped heat exchanger plates made of 1.4404. The plate stacks were brazed in the vacuum furnace at a temperature of approx. 1195° C., which was maintained for approx. 1 hour. This produced 14-layer heat exchangers with dimensions of 90 mm×464 mm×57 mm (GNS 240-14) that had a water volume of 0.91 litres and a water-contacting inner area of approx. 1.26 $m^2/l$.

It was found that the alloy B13 with a boron content of less than 6 atom % could be brazed very effectively. Even the burst pressure of the heat exchangers produced using B13 were approx. 10% higher (107 bar vs. 97 bar) than those of heat exchangers produced with the standard braze A4.

This was followed by long-term exposure in drinking water (Hanau, Germany) and regular checking of heavy metal ion release into the sample water. Since very low heavy metal releases were expected and the detection limit of nickel with the analysis method used is 5 µg/l, substantially longer exposure times were used. After 15 minutes rinsing the water pipe and several hours rinsing the heat exchanger both circuits were filled with the water for the test and tested according to the following scheme.

1 week sample: The plate heat exchanger is filled with fresh water and sealed tightly with a rubber stopper. A reference sample is also filled. After 168 hours at room temperature all the water is removed from both circuits and 250 ml of the sample are sent for analysis. This step is repeated until the test has lasted for a total of three months.

Table 10 shows the result of the heavy metal analyses in µg/l of Ni+Fe+Cu (Ni) in the drinking water at a stagnation period of 168 hours for the heat exchangers in test series 4. This stagnation period corresponds to 10 to 40 times that specified in the tests detailed in DIN EN 16058 (4 h, 8 h, 16 h). Values from test weeks W1 ... W5 and the mean values (MW) from the five measurements.

TABLE 10

| 168 h | W 1 | W 2 | W 3 | W 4 | W 5 |
|---|---|---|---|---|---|
| PWT2-A4 | 1710 | 407 | 164 | 406 | 1225 |
| | (1400) | (360) | (140) | (400) | (990) |
| PWT2-B13 | 950 | 643 | 310 | 85 | 77 |
| | (810) | (540) | (190) | (76) | (58) |

In a direct comparison after long-term exposure and with a large water-contacting surface the heat exchangers also exhibited significantly lower heavy metal emissions with brazing material B13 than with the comparative braze A4. After a few weeks in contact with the water the emission values of the heat exchanger with braze B13 fell to very low levels, while the heat exchanger with A4 had still not reached a hygienically acceptable level. This result also matched the qualitative result of the small braze sample P1.

It is expected that, after a heat exchanger operating period of 4 weeks in the test specified in DIN EN 16058 and stagnation times of 16 hours, mean nickel emissions would not exceed 10 μg/l and would thus meet the regulatory requirements.

SPECIFIC EMBODIMENTS

In one embodiment, a brazed heat exchanger made of a stainless steel such as X2CrNiMo17-12-2 or similar with a media-contacting surface area ratio of approx. 0.5 to 2 m²/l (or >0. m²/l) is produced. The heat exchanger is produced using a stacked plate technique, the plates having a sheet thickness of approx. 0.1 to 0.5 mm. Arranged between the metal plates is at least one preform made of an amorphous brazing foil with a mean thickness of approx. 40 to 60 μm and a width of approx. 80 to 250 mm. The braze preform is first shaped by cutting and/or punching and/or bending.

The heat exchanger according to the invention is characterised in that the amorphous nickel-based brazing foil used has the following composition according to the invention:

Table 11 shows the composition of the braking foil according to the invention.

TABLE 11

| Element | % w/w | Atom % |
|---|---|---|
| Ni | Bal. >70 | >60 |
| Cr | 11-16 | 11-16 |
| preferably Cr | 11-14 | 11-14 |
| Mo | 1-6 | 0.5-3.5 |
| Si | 6-8.5 | 11-16 |
| B | 0.8-1.5 | 4-7 |
| preferably B | 0.8-1.25 | 4-6 |
| preferably B | 0.8-1.15 | 4-5.5 |
| C | <0.2 | <0.85 |
| P | <0.3 | <0.5 |
| Fe, Co | <5 | <5 |
| Cu, V | <2 | <2 |
| Nb | <3.5 | <2 |
| O + N | <0.01 | <0.035 |

The plate/brazing foil stack assembled in this manner is cohesively connected in a vacuum furnace with the application of a weight or clamping force at a maximum brazing temperature of approx. 1200° C. that is maintained for 0.5 to 3 hours. The heat exchanger joined in this manner is able to withstand high pressures of over 80 bar immediately after the brazing process without having to be fitted in a special pressure frame. In all of the drinking water qualities specified in German standard Norm DIN EN 15664-2 the heat exchanger exhibits lower heavy metal migration, i.e. less than 20 μg/l nickel or, better, less than 10 μg/l nickel, after an exposure time of 360 hours at 25° C. in a volume of drinking water, the water-contacting area being 0.23 m²/l.

A heat exchanger produced in this manner emits significantly fewer heavy metal ions into the stagnating drinking water it contains than comparable heat exchangers produced with amorphous nickel-based braze preforms of the same quality and geometry, but which are not made using the composition according to the invention. With the heat exchanger according to the invention it is, therefore, possible to emit only minimal quantities of heavy metals whilst also meeting strict limit value requirements without difficulty even in drinking waters with a conductivity of more than 500 μS/cm.

The invention claimed is:

1. An object having a first part and a second part, the first part being permanently connected to the second part by a brazed seam produced using a brazing foil, the brazing foil with a composition consisting essentially of 11 atom %<Cr≤16 atom %, 0 atom %≤Mo≤3.5 atom %, 4 atom %≤B≤5.5 atom %, 11 atom %≤Si≤16 atom %, 0 atom %≤P≤0.5 atom %, 0 atom %≤C≤0.85 atom %, 0 atom %≤Fe≤5 atom %, 0 atom %≤Co≤5 atom %, 0 atom %≤Cu≤2 atom %, 0 atom %≤V≤2 atom %, 0 atom %≤Nb≤2 atom %, incidental impurities of ≤1.0 wt. %, one or more of the elements Mo, Nb, and V up to the respective maximum atom %; and at least 0.5 atom % of one or more of the elements Mo, Nb and V being present, and the rest Ni.

2. An object according to claim 1, wherein the first part and the second part are each made of a stainless steel that contains at least 12 wt. % chromium, and at least 0.5 wt. % molybdenum.

3. An object according to claim 1, wherein the object is a heat exchanger or part of a heat exchanger that comes into contact with drinking water during operation.

4. An object according to claim 1, wherein the object is a heat exchanger with a media-contacting surface ratio greater than 0.5 m²/l.

5. An object according to claim 1, wherein the object has a burst pressure of over 60 bar.

6. An object according to claim 1, wherein the object carries water during operation and, after an operating period of more than 4 weeks in the drinking water and an exposure time of 168 hours at 25° C. in a volume of drinking water and with a drinking-water-contacting surface area ratio of 1.25 m²/l, emits a total Ni concentration of less than 200 μg/l into the drinking water.

7. An object according to claim 1, wherein the object carries water during operation and, after an operating period of more than 4 weeks in the drinking water and an exposure time of 168 hours at 25° C. in a volume of drinking water and with a drinking-water-contacting surface area ratio of 1.25 m²/l, emits a total concentration of Ni plus Cu plus Fe of less than 400 μg/l into the drinking water.

* * * * *